Oct. 25, 1949.  R. M. WOYTYCH  2,485,799
TOOLHEAD
Filed Aug. 7, 1946
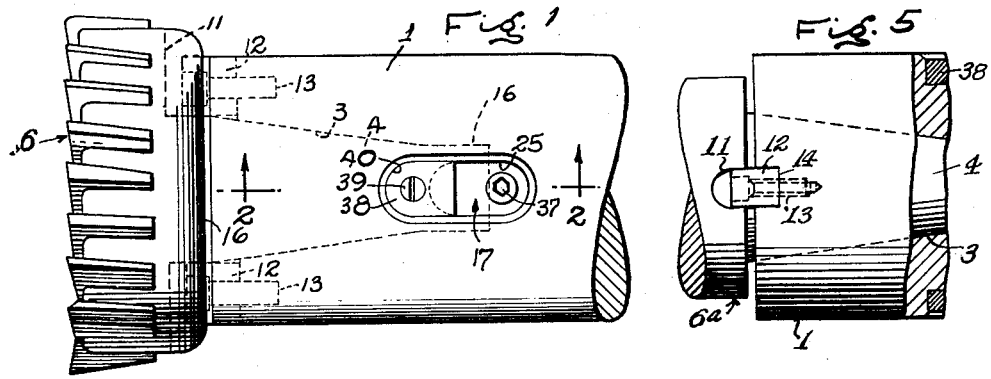
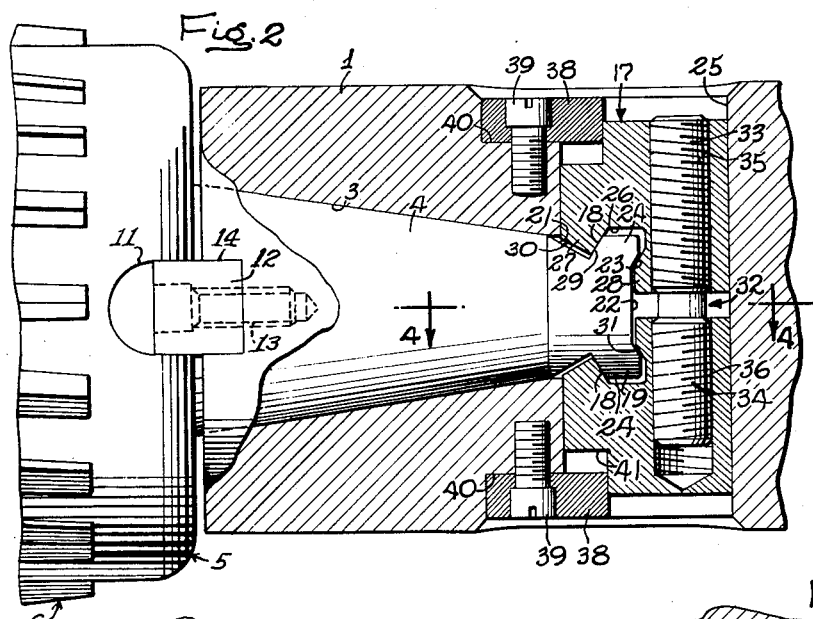
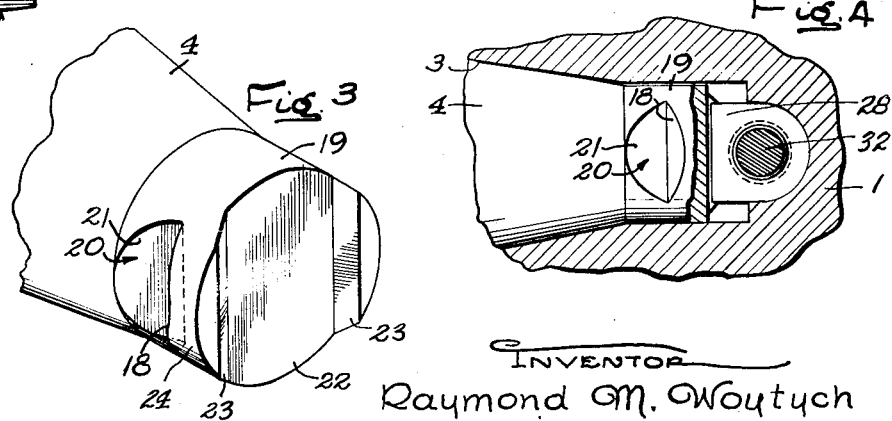
INVENTOR
Raymond M. Woytych
By Carlson, Pigner, Hubbard & Wolfe
ATTORNEYS Patented Oct. 25, 1949

2,485,799

UNITED STATES PATENT OFFICE 2,485,799

TOOLHEAD

Raymond M. Woytych, Fond du Lac, Wis., assignor to Giddings & Lewis Machine Tool Co., Fond du Lac, Wis., a corporation of Wisconsin Application August 7, 1946, Serial No. 688,885

15 Claims. (Cl. 279—76)

The present invention relates generally to improvements in tool heads, and has particular reference to heads of the type adapted to removably receive and support the taper shank of a rotary tool holder.

One of the objects of the invention is to provide a novel tool head in which the taper shank of the tool holder may be quickly, conveniently and accurately inserted and removed.

Another object is to provide a new and improved tool head provided with a quick-change device for locking the taper shank of the removable tool holder in position.

A further object is to provide a novel tool head of the foregoing character which is simple and inexpensive in construction, and which is efficient and reliable in operation.

Another object is to provide a new and improved tool head having a floating cam unit which is reversibly operable selectively to tighten and lock the taper shank of the tool holder accurately in centered position or to release and partially eject the shank so as to insure breaking of any wedge lock between the taper surfaces preparatory to removal of the shank.

Further objects and advantages will become apparent as the description proceeds.

In the accompanying drawings:

Fig. 1 is a fragmentary plan view of a tool head embodying the features of the present invention.

Fig. 2 is a fragmentary side elevational view of a tool head, partially in vertical section along line 2—2 of Fig. 1.

Fig. 3 is a fragmentary perspective view of the locking end of the taper shank.

Fig. 4 is a fragmentary horizontal sectional view taken along line 4—4 of Fig. 2.

Fig. 5 is a fragmentary side elevational view of a modified holder assembly.

Referring more particularly to the drawings, the tool head or quick change locking assembly, constituting the exemplary embodiment of the invention, comprises a cylindrical body 1, which may constitute, form part of, or be mounted in a rotary machine tool spindle. In the present instance, the spindle or body 1 is shown as formed in the outer end with a coaxial taper socket 3 adapted to receive and center a complemental taper shank 4 of a tool or tool holder 5.

The tool holder 5 may be of any desired type and adapted to support a rotary cutting tool, and adapted for rotary drive connection with the body 1 when the shank 4 is tightly inserted and secured into the taper socket 3. In the form shown in Figs. 1 to 4, the shank 4 is integral with the body of a face milling cutter 6 having inserted blades. Fig. 5 shows a holder 5 in which the shank 4 is integral with a boring bar 6a adapted to support a boring tool (not shown).

To provide a positive separable rotary drive connection between the body 1 and the tool holder 5, the body of the cutter 6 is formed in the outer periphery with two diametrically-opposite parallel-sided radial notches 11 constituting keyways. Two dogs or drive keys 12, provided on opposite sides of the body 1, are arranged to project from the outer end thereof with a snug sliding fit into the keyways 11. In the present instance, the keys 12 are rigidly secured by means of bolts 13 into two diametrically-opposite parallel-sided notches 14 formed in the periphery of the body 1 and opening to the end thereof. The notches 11 and the keys 12 serve when engaged not only to afford a drive connection for the cutter 6, but also to locate the shank 4 in a predetermined rotary position within the socket 3 to correctly align the locking means as hereinafter described.

The present invention resides primarily in the provision of readily accessible and quickly operable locking means for drawing the shank 4 of the tool holder 5 tightly into the socket 3 and securely clamping it therein, and for positively disengaging the taper surfaces of the socket and shank when the latter is to be removed. The surfaces of the socket 3 and shank 4 may be tapered at any desired degree, but preferably the taper angle is non-locking in character so that the parts will be self-releasing or at least subject only to a light binding engagement in order to facilitate removal of the tool holder 5 when the locking means is disengaged. The inner end of the taper socket 3 opens to a coaxial bore 16 in the body 1.

The locking means, in general, comprises one or more, and preferably two, wedge cam members 17 adjustably mounted within the body 1 for simultaneous movement transversely of the axis of rotation into and out of interlocking engagement with coacting wedge surfaces 18 on the inner end of the shank 4. More particularly, a coaxial cylindrical terminal projection 19 is provided on the small end of the shank 4, and adapted to extend with a slight clearance into the bore 16, and has a diameter not greater than and preferably substantially equal to the minimum diameter of the taper surface of the shank. The cylindrical projection 19 is formed in the periphery with one or more transverse grooves or notches 20 having outwardly facing sides defining the wedge suface or surfaces 18. Preferably, separate transverse V-shaped notches 20 corresponding in number to the wedge cam members 17 are provided, and, in this instance, each notch has two oppositely inclined sides, one defining the wedge surface 18 and the other defining a clearance surface 21. The plural wedge cam members 17, whatever their number, and likewise the coacting wedge notches 20, are symmetrically arranged about the common axis of the body 1 and shank 4, so that upon actuation of the locking means a balanced axial thrust will be imparted to the shank. Thus, where two wedge cam members 17 are provided, as shown, the members are located in diametrically-opposite relation, and the coacting notches 20 are correspondingly formed in opposite sides of the cylindrical projection 19. Within the broad aspects of the invention, the notches 20 may have any desired shape or form transversely of the projection 19, but preferably they are straight and parallel as secants of the projection, so that the wedge surfaces 18 will be flat and adapted for surface contact over a substantial area in all positions of overlapping engagement with the wedge cam members 17. It will be understood that if the notches 20 were arcuate in form, only line contact with the elements 17 would be obtained.

Formed in the end face of the projection 19 is a straight, wide, flat-bottomed, diametrical groove 22, which extends parallel to the notches 20, and which has spaced oppositely inclined sides 23 defining wedge cam surfaces, respectively paralleling the surfaces 18. In effect, the portions of the projection 19 located between the parallel wedge surfaces 18 and 23 at opposite sides constitute diametrically-opposite inclined wedge cam lugs 24 arranged for coaction with the wedge cam members 17 either to clamp the shank 4 tightly in position or to loosen the shank from the socket 3.

The wedge cam members 17 are slidably disposed in opposite ends of a non-circular slot 25 which extends diametrically through the body 1, and which intersects the bore 16 so as to open intermediate its ends to the inner end of the taper socket 3. The keyways 11 in the holder or cutter body are so related to the lugs 24 that when in engagement with the keys 12, they serve to position the shank 4 so that the lugs will be in proper alignment for engagement by the wedge cam members 17. Each of the wedge cam members 17 is generally in the form of a block conforming in size and shape to the slot 25, and formed in the inner end with a recess 26 adapted to receive the adjacent wedge cam lug 24. The recess 26 in a sense bifurcates the inner end of the cam block 17 to define spaced cam elements 27 and 28 adapted for coaction respectively with the opposite side wedge surfaces 18 and 23 of the adjacent wedge cam lug 24. Thus, the outermost cam element 27 is adapted to enter the adjacent groove 20, and is V-shaped, with one side face thereof presenting a cam surface 29 adapted for wedge camming engagement with the surface 18, and with the other side face thereof presenting a surface 30 parallel to but spaced from the surface 21. In other words, clearance is provided between the surfaces 21 and 30 when the cam member 17 is fully applied so as to permit coaction between the surfaces 18 and 29 without interference. The innermost cam element 28 extends radially inwardly beyond the cam element 27, and is normally disposed within the groove 22. This cam element has an inclined face presenting a cam surface 31 adapted for wedge camming engagement with the surface 23 when the cam member 17 is moved outwardly.

Suitable means is provided for adjusting the wedge cam members 17 simultaneously either radially inwardly into interlocking engagement with the taper shank 4 or radially outwardly to release the shank. In the present instance, this means comprises a double-end adjusting screw 32 having screw elements 33 and 34 of opposite hand leads in threaded engagement respectively with radially disposed and aligned tapped bores 35 and 36 in the respective cam members 17. At least one of the bores, namely, the bore 35 opens completely through its cam block so that the outer end of the associated screw element 33 is accessible for actuation from the side exterior of the body 1. Preferably the other bore 36 is closed from the exterior. The screw element 33 is formed in the outer end with a non-circular socket 37 adapted to receive a suitable hand tool, such as the interfitting end of an Allen wrench (not shown). By providing a socket 37 in only one end of the screw 32, a convenient directional control is obtained. Thus, the screw 32 is always turned in a clockwise direction to apply the cam elements 17, and in a counterclockwise direction to disengage and retract the cam elements.

To limit the outward movement of the cam members 17, suitable rectangular keys 38 are secured by bolts 39 in diametrically-opposite recesses 40 formed in the periphery of the body 1. The keys 38 extend from the recesses 40 partially across the outer ends of the slot 25 and into keyways 41 of complemental shape for slidable inter-engagement with the outer ends of the cam members 17.

To insert and lock the taper shank 4 tightly in the taper socket 3, the screw 32 is rotated to retract the cam members 17 into their outermost positions, thereby withdrawing the cam elements 27 outwardly a sufficient distance permitting insertion of the cylindrical projection 19. The taper shank 4 of the tool holder 5 is now inserted by hand into the taper socket 3, and is so guided that the drive keys 12 will enter the keyways 11, thereby locating the wedge cam lugs 24 axially inwardly of the cam elements 27, and in proper registration therewith. The screw 32 is now rotated to move the cam members 17 inwardly. As a result, the cam elements 27 will enter the notches 20, and through wedge camming engagement with the surfaces 18 will tighten the shank 4 and positively lock it in centered position within the taper socket 3. Since the cam blocks 17 and the connecting screw 32 constitute a floating unit, the locking pressure will be equally applied and balanced to insure exact axial alignment of the shank 4 within the body 1.

When the shank 4 is to be removed, the screw 32 is simply turned to retract the cam members 17 into their outermost positions. In the initial movement of the cam members 17, the cam surface 29 of the cam elements 27 are disengaged from the wedge surfaces 18 to release the shank 4, and then the cam surfaces 31 of the cam elements 28 strike against the wedge surfaces 23 to force the shank outwardly, thereby insuring separation of the taper surfaces of the shank and socket 3 in the event that these should be in binding engagement. When the cam members 17 have been fully retracted into position against the stop keys 38, the cam elements 27 will be entirely out of the path of the wedge cam lugs 24 so that the shank 4 can be readily removed.

It will be evident that I have provided a new and useful tool head in which the tool holder 5 may be easily and quickly secured in or removed from the taper socket 3. All that is required to secure to tool holder 5 in the spindle 1 is simply to insert the shank 4 by hand into the taper socket 3, with the keyways 11 in registration with the keys 12, and then to impart a quick turn to the screw 32 in a predetermined direction to apply the locking means, or, in removing the shank, to impart a quick turn in the opposite direction to the screw, whereupon the shank may be readily removed. Merely by removing one of the stop keys 38, provided the projection 19 of the shank 4 has been withdrawn from the slot 25, the floating cam unit, comprising the members 17 and screw 32, can be completely removed from the slot 25 for the purpose of cleaning and oiling.

I claim:

1. A tool head comprising, in combination, a rotary cylindrical spindle body having an axial taper socket opening to one end and a diametrical slot of non-circular transverse form opening therethrough, a tool holder having a taper shank adapted to be removably inserted in tight bearing engagement in said socket, an axial cylindrical projection on the small end of said shank and adapted to extend from said socket into said slot, said projection being formed in opposite sides with straight parallel V-shaped notches presenting inclined outwardly facing cam wedge surfaces, and being formed in the extreme end with a straight diametrical groove parallel to said notches and having inclined inwardly facing wedge surfaces parallel to said first mentioned surfaces, two wedge cam members slidably disposed in opposite ends of said slot and each formed with spaced cam elements having cam faces adapted for surface engagement respectively with said inwardly and outwardly facing wedge surfaces respectively upon inward and outward movement of said cam members, means for locating said shank angularly in said socket to align said wedge surfaces with said cam faces, and means for simultaneously moving said cam members either inwardly into equalized locking engagement with said projection or outwardly to permit withdrawal of said projection.

2. A tool head comprising, in combination, a rotary cylindrical body having an axial taper socket opening to one end and a diametrical slot of non-circular transverse form opening therethrough, a tool holder having a taper shank adapted to be removably inserted in tight bearing engagement in said socket, an axial cylindrical projection on the small end of said shank and adapted to extend from said socket into said slot, said projection being formed in opposite sides with straight parallel V-shaped notches presenting inclined outwardly facing cam wedge surfaces, two wedge cam members freely slidably disposed in opposite ends of said slot and formed respectively with cam faces adapted for engagement respectively with said wedge surfaces upon inward movement, means for locating said shank angularly in said socket to align said wedge surfaces with said cam faces, and adjusting means connecting said cam members to constitute a diametrically floating cam unit and operable to simultaneously move said cam members either inwardly into equalized wedge locking engagement with said projection or outwardly beyond the periphery of said projection to permit withdrawal of said shank from said socket.

3. A tool head comprising, in combination, a rotary body having an axial taper socket opening to one end and a diametrical slot intersecting the inner end of said socket, a tool holder having a taper shank adapted to be removably inserted in tight bearing engagement in said socket and having a small end adapted to extend from said socket into said slot, said shank end being formed in the periphery with two straight parallel V-shaped notches presenting inclined outwardly facing cam wedge surfaces, two wedge cam members freely slidable and non-rotatably disposed in opposite ends of said slot and each formed with a V-shaped cam element having a cam face, said faces being adapted for engagement respectively with said wedge surfaces upon inward movement of said cam members, and means for simultaneously moving said cam members either inwardly into wedge locking engagement with said shank end or outwardly beyond the range of said wedge surfaces to permit withdrawal of said shank.

4. A tool head comprising, in combination, a rotary body having an axial taper socket opening to one end and a diametrical slot intersecting the inner end of said socket, a tool holder having a taper shank adapted to be removably inserted in tight bearing engagement in said socket and having a small end adapted to extend from said socket into said slot, said shank end being formed in the periphery with two straight parallel V-shaped notches presenting inclined outwardly facing cam wedge surfaces, two wedge cam members freely slidable and non-rotatably disposed in opposite ends of said slot and each formed with a V-shaped cam element having a cam face, said faces being adapted for engagement respectively with said wedge surfaces upon inward movement of said cam members, and a transverse adjusting screw having opposite end screw elements respectively of opposite hand leads respectively in threaded engagement with said cam members, one end of said screw being accessible for manual actuation from one side of said body to move said members simultaneously either inwardly into wedge locking engagement with said wedge surfaces or outwardly beyond the range of said wedge surfaces to permit withdrawal of said shank.

5. A tool head comprising, in combination, a rotary body having an axial taper socket opening to one end and a diametrical slot intersecting the inner end of said socket, a tool holder having a taper shank adapted to be removably inserted in tight bearing engagement in said socket and having a small end adapted to extend from said socket into said slot, said shank end being formed in the periphery with two straight parallel V-shaped notches presenting inclined outwardly facing cam wedge surfaces, two wedge cam members freely slidable and non-rotatably disposed in opposite ends of said slot and each formed with a V-shaped cam element having a cam face, said faces being adapted for engagement respectively with said wedge surfaces upon inward movement of said cam members, a transverse adjusting screw having opposite end screw elements respectively of opposite hand leads respectively in threaded engagement with said cam members, one end of said screw being accessible for manual actuation from one side of said body to move said members simultaneously either inwardly into wedge locking engagement with said wedge surfaces or outwardly beyond the range of said wedge surfaces to permit withdrawal of said shank, and stop means on said body for movably confining said cam members within said slot, said stop means being removable to permit complete removal of said cam members and screw as a unit from said slot.

6. A tool head comprising, in combination, a rotary body having an axial taper socket opening to one end and a diametrical slot intersecting the inner end of said socket, a tool holder having a taper shank adapted to be removably inserted in tight bearing engagement in said socket and having a small end adapted to extend from said socket into said slot, said shank end being formed on the periphery with wedge means presenting a transversely extending radially inclined wedge surface area, two wedge cam members slidable in opposite ends of said slot and having inclined cam faces adapted for clamping engagement with said area to secure said shank in said socket, and reversibly adjustable screw means for moving said cam members either inwardly into said clamping engagement or outwardly to release said shank.

7. A tool head comprising, in combination, a rotary body having a taper socket opening to one end, a tool holder having a taper shank adapted for insertion into said socket, the small end of said shank being formed in the periphery with a plurality of transversely extending notches presenting radially inclined wedge surfaces, a plurality of uniformly peripherally spaced cam members radially slidable in said body either inwardly for wedge camming engagement with said surfaces to tighten and lock said shank axially in said socket, or outwardly to release said shank, and means for simultaneously and reversibly actuating said cam members.

8. A tool head comprising, in combination, a rotary body having a taper socket opening to one end, a tool holder having a taper shank adapted for insertion into said socket, the small end of said shank being formed in the periphery with a plurality of transversely extending notches presenting radially inclined wedge surfaces, a plurality of uniformly peripherally spaced cam members radially slidable in said body either inwardly for wedge camming engagement with said surfaces to tighten and lock said shank axially in said socket, or outwardly to release said shank, means on said cam members movable into wedging engagement with said shank end upon outward actuation of said members to break contact between the taper surfaces of said shank and socket, and means for simultaneously and reversibly actuating said cam members.

9. A tool head comprising, in combination, a rotary body having an axial taper socket opening to one end and a radial slot intersecting the inner end of said socket, a tool holder having a taper shank adapted to be removably inserted in tight bearing engagement in said socket and to extend from said socket into said slot, the small end of said shank being formed in one side with a straight notch presenting an inclined outwardly facing wedge surface, and being formed in the extreme end with a straight groove parallel to said notch and having an inclined inwardly facing wedge surface parallel to said first mentioned surface, a cam member slidably disposed in said slot and formed with spaced cam elements having cam faces adapted for engagement respectively with said wedge surfaces respectively upon inward and outward movement of said cam member, and means for reversibly adjusting said cam member in said slot.

10. A quick change tool support comprising, in combination, a rotary body having an axial taper socket opening to the outer end of said body and formed with a cylindrical extension at the inner end and having a diametrical slot intersecting said cylindrical extension, a tool holder having a taper shank adapted to be removably inserted in tight engagement in said socket and having a cylindrical projection on the small end adapted to extend from said socket into said cylindrical extension, said projection being formed on the periphery with wedge means presenting a transversely extending radially inclined wedge surface area, two wedge cam members slidable in opposite ends of said slot and having inclined cam faces adapted for clamping engagement with the said area to secure said shank in said socket, reversibly adjustable screw means for moving said cam members either inwardly into said clamping engagement or outwardly to release said shank, and a rotary drive connection between said body and said holder comprising interfitting slots and keys respectively engageable and separable upon movement of said shank axially into and out of said socket, said slots and keys serving also to locate said shank rotationally in said socket so as to align said wedge surface area with said cam faces.

11. A tool head comprising, in combination, a rotary body having a taper socket opening to one end, a tool holder having a taper shank adapted for insertion into said socket, the small end of said shank being formed in the periphery with a plurality of transversely extending notches presenting radially inclined wedge surfaces, a plurality of uniformly peripherally spaced cam members radially slidable in said body either inwardly for wedge camming engagement with said surfaces to tighten and lock said shank axially in said socket, or outwardly to release said shank, an axially separable rotary drive connection between said body and said holder operable when in engagement to align said notches with said cam members, means on said cam members movable into wedging engagement with said shank end upon outward actuation of said members to break contact between the taper surfaces of said shank and socket, and means for simultaneously and reversibly actuating said cam members.

12. A tool head comprising a rotary body having an axial taper socket opening to one end and adapted to receive a taper shank, a plurality of cam members radially slidable in said body and adapted upon inward movement for wedge camming engagement with the inner end of said shank when inserted in said socket to tighten and lock said shank in said socket by a balanced axial thrust in axially centered position, and screw means interconnecting said cam members into a diametrically floating unit and being reversibly operable to adjust said cam members simultaneously either inwardly to clamp said shank or outwardly to release said shank.

13. A tool head comprising a rotary body having an axial taper socket opening to one end and adapted to receive a taper shank, a plurality of cam members radially slidable in said body, cam elements on the inner ends of said members movable inwardly therewith for wedge camming engagement with the inner end of said shank when inserted in said socket to tighten and lock said shank therein in axially centered position, cam elements on the inner ends of said members movable outwardly therewith for wedge camming engagement with said inner end of said shank to separate said shank from surface contact with said socket, and screw means interconnecting said cam members into a diametrically floating unit and being reversibly operable to adjust said cam members simultaneously either inwardly to clamp said shank or outwardly to release said shank.

14. A tool head comprising, in combination, a rotary spindle body having an axial taper socket opening to one end and a substantially diametrical slot intersecting the inner end portion of said socket, a tool holder having a taper shank adapted to be removably inserted in tight bearing engagement in said socket, an axial projection on the small end of said shank and adapted to extend from said socket into said slot, said projection being formed on the periphery with wedge means presenting a transversely extending radially inclined wedge surface area, and being formed in the extreme end with a recess presenting a transversely extending wedge engaging area, two wedge cam members slidably disposed in opposite end portions of said slot and having cam faces adapted for clamping engagement with said first mentioned wedge surface area upon inward movement of said cam members to secure said shank in said socket, cam means movable with at least one of said cam members and adapted for wedging engagement with said second mentioned wedge surface area upon outward movement of said cam members to break contact between the taper surfaces of said socket and shank, and reversibly operable screw means interconnecting said cam members for simultaneously moving said cam members either inwardly into locking engagement with said projection or outwardly to permit withdrawal of said projection.

15. A tool head comprising, in combination, a rotary body having a taper socket opening to one end, a tool holder having a taper shank adapted for insertion into said socket, the small end of said shank being formed in the periphery with transversely extending wedge surface means, a plurality of uniformly peripherally spaced cam members radially slidable in said body either inwardly for wedge camming engagement with said wedge surface means to tighten and lock said shank axially in said socket, or outwardly to release said shank, means movable into wedging engagement with said shank end upon outward actuation of said members to break contact between the taper surfaces of said shank and socket, and means for simultaneously and reversibly actuating said cam members.

RAYMOND M. WOYTYCH.

REFERENCES CITED

The following references are of record in the file of this patent:

UNITED STATES PATENTS

| Number | Name | Date |
| --- | --- | --- |
| 1,436,573 | Chappinet et al. | Nov. 21, 1922 |
| 1,802,053 | Halborg | Apr. 21, 1931 |
| 1,958,817 | Gase | May 15, 1934 |
| 2,338,989 | Welte | Jan. 11, 1944 |